Figure 1:
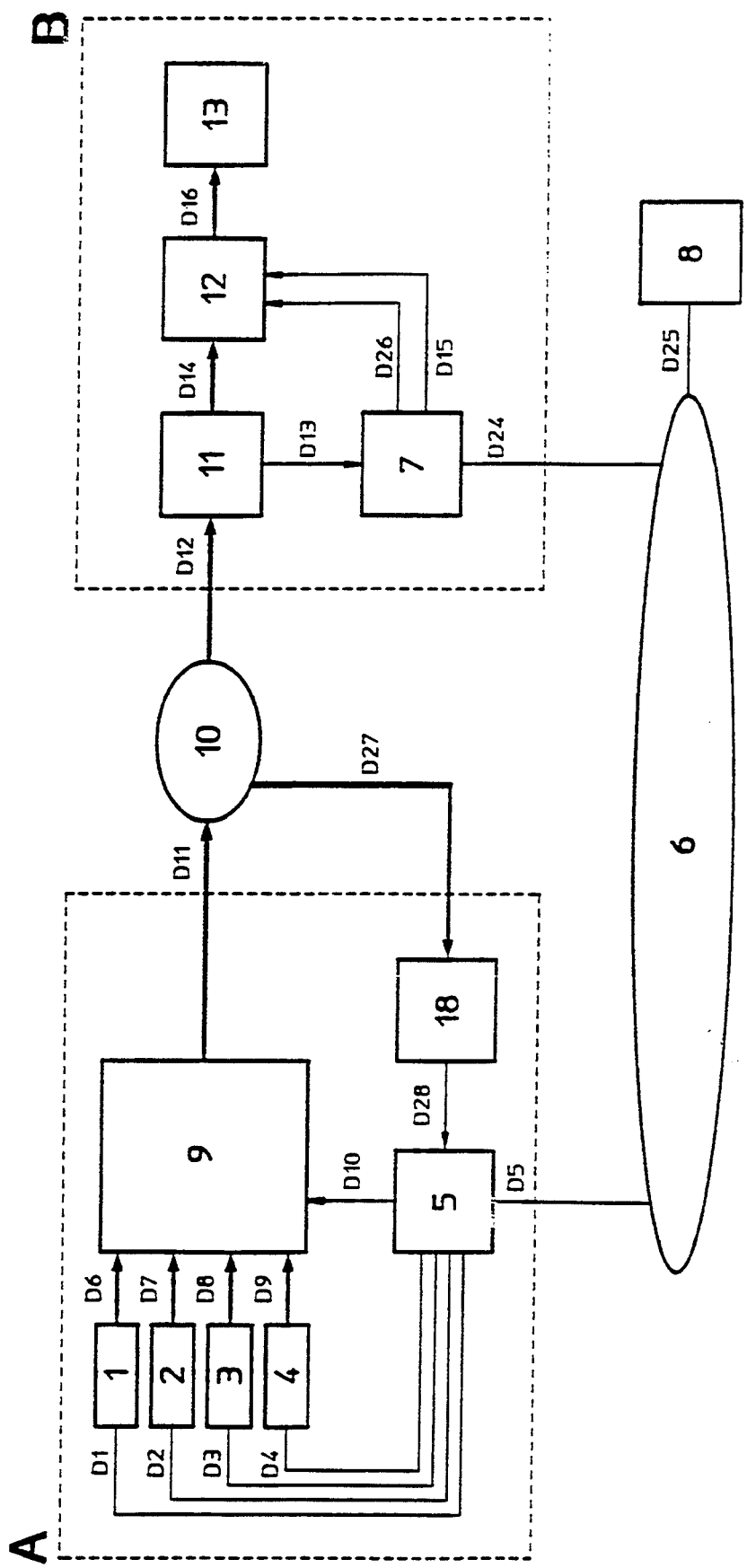

United States Patent [19]
Hannina et al.

[11] Patent Number: 5,371,607
[45] Date of Patent: Dec. 6, 1994

[54] INTERACTIVE COMMUNICATION AND TRANSPORT SYSTEM FOR STILL PICTURES

[75] Inventors: Rita Hannina, Zoetermeer; Björn S. Mens, Elim, both of Netherlands

[73] Assignee: Koninklijke PTT Nederland B.V., Groningen, Netherlands

[21] Appl. No.: 960,415

[22] PCT Filed: Jun. 21, 1991

[86] PCT No.: PCT/NL91/00104

§ 371 Date: Dec. 18, 1992

§ 102(e) Date: Dec. 18, 1992

[87] PCT Pub. No.: WO91/20144

PCT Pub. Date: Dec. 26, 1991

[30] Foreign Application Priority Data

Jun. 21, 1990 [NL] Netherlands .................. 9001423

[51] Int. Cl.$^5$ .................................................. H04N 1/00
[52] U.S. Cl. ............................ 358/402; 358/400; 358/434
[58] Field of Search ............ 358/400, 401, 402, 403, 358/434, 435, 436, 438, 439, 442, 468, 909; 370/60, 94.1

[56] References Cited

U.S. PATENT DOCUMENTS

| | | | |
|---|---|---|---|
| 4,644,470 | 2/1987 | Feigenbaum et al. | 395/200 |
| 4,653,112 | 3/1987 | Ouimette | 382/69 |

FOREIGN PATENT DOCUMENTS

| | | |
|---|---|---|
| 0192795A1 | 9/1986 | European Pat. Off. . |
| 2171578A | 8/1986 | United Kingdom . |
| WO87/05767 | 9/1987 | WIPO . |
| WO91/20144 | 12/1991 | WIPO . |

OTHER PUBLICATIONS

L. H. Ngoh et al, "Multicast Communication Facilities for Distributed Multimedia Information Systems", Apr. 2-5, 1989, Second IEEE National Conference on Telecommuncations, pp. 271-276.

G. Waters et al, "Three-party talk facility on a computer network", Jun. 1987, pp. 115-120, Computer Communications, No. 3, vol. 10.

David R. Cheriton et al, "HOST GROUPS: A Multicast Extension for Datagram Internetworks", Sep. 10-13, 1985, pp. 172-173.

*Primary Examiner*—Edward L. Coles, Sr.
*Assistant Examiner*—Thomas D. Lee
*Attorney, Agent, or Firm*—Frishauf, Holtz, Goodman & Woodward

[57] ABSTRACT

An interactive communication and transport system in which communication for the purpose of requests takes place between requesting receiving stations (B) and one or more request-processing transmitting stations (A) provided with a source (1-4) of information of separately specifiable bulk data (including picture data) via a relatively low-speed communication path in a first network (6), and the forwarding of the requested bulk data to receiving stations (B) specified in the requests by transmitting devices (14-17) takes place in a packet-switched mode via a relatively high-speed transmission path in a second network (10). Temporary destination addresses are assigned to the receiving stations (B) for the forwarding, and permission is granted for forwarding to the transmitting workstations (A) on request. The actual forwarding of data takes place after a respective transmitting station (A), which has received permission, has detected, by an "end of packet" detector (18), that transmission of a previous packet has been completed. The data channel along which picture data is transported is thus used more efficiently, and forwarding of picture data to a group of destinations is possible both on request and dynamically from the system.

8 Claims, 12 Drawing Sheets

INTERACTIVE COMMUNICATION AND TRANSPORT SYSTEM FOR STILL PICTURES

A. BACKGROUND OF THE INVENTION

1. Field of the Invention

The invention is in the field of interactive communication and transport systems in which, on request, the information of still pictures specified in said request is forwarded to one or more attached workstations from a source of information of still pictures or of other bulk data. More specifically, the invention relates to an interactive communication and transport system in which communication for the purpose of requests between requesting workstations and at least one source of information of still pictures takes place via a relatively low-speed communication path and the transmission, that is to say the actual transport, of information of still pictures specified in the request takes place from the source to the requesting workstations via a relatively high-speed transmission path.

2. Prior Art

Interactive communication and transport systems of a type as described above are known per se, for example from reference [1](see under C.). This reference describes a system for integrated communication services. Said system is composed of a first packetswitched ring-type network for communication services at relatively low speed, namely up to 10 Mbit/sec, and a second circuit-switched ring-type network, in overlay, for services which require a high speed. Bulk data transports take place via said overlay network which comprises eight high-speed channels of 70 Mbit/sec each, the access to the overlay network being controlled by means of communication at lower speed via the first network. One of the services which can be provided in such a network is, as described briefly in section 6 of said reference, the so-called 'still picture' service. For this purpose, the system comprises one or more workstations and a source of requestable information of still pictures, which are attached both to the first network and to the overlay network. An attached workstation can send a request over the first network to the source for the purpose of forwarding a still picture specified in said request, whereupon the source then forwards said information to said workstation via a circuit- switched connection set up, to the requesting workstation in one of the high-speed channels reserved therefore.

Reference [2] discloses a digital picture communication network with two communication channels, of which a first channel handles general data communication and also acts as control channel for the second channel, over which the transport of digital bulk data exclusively takes place. Said bulk data may comprise information of still pictures, digitised speech information or other data in the form of large packets which are stored in a centrally situated database, the picture source, and which are requestable by a user from a workstation connected to both channels of the network by means of requests via the control channel. As is described in reference [2] from line 11 onwards on page 11 to line 16 inclusive on page 12, said known digital picture communication network is of a design such that, after the requested picture has been located in the picture source by means of indexing means, central control means first set up a circuit-switched connection to the requesting workstation over the second channel by means of communication over the first channel, whereupon the picture source is given permission to forward the requested picture data over said special connection. Once the transmission has been completed, the circuit-switched connection is disconnected, which is accompanied by the necessary control communication via the first channel, before a subsequent circuit-switched connection can be established for a subsequent request.

Said systems known from references [1] and [2] both have the disadvantage that a connection which is separate because it is circuit-switched always has to be set up to the requesting workstation for the purpose of forwarding the bulk data of a picture. Since the time period for which this connection exists is much longer than the period of the actual forwarding of a requested picture, the second channel is not used efficiently. This is all the more true if, in addition, forwarding of the same picture to yet one or more other workstations is necessary, since separate connections then have to be set up consecutively for this purpose. It is precisely in interactive applications, in which users must be able to request such pictures rapidly from their workstations, that this can result in unacceptable waiting times. It is furthermore not known from this how two or more picture sources can use one channel.

Reference [3] discloses a communication and transport system which comprises an overlay network which operates at relatively high speed and which is used in a packet-switched mode for transporting bulk data, in which the access to the overlay network is regulated with the aid of a single token mechanism on a packet-switched low-speed ring-type network. This system may comprise several bulk-data transmitters and many receivers which are connected to both networks. A receiver takes in a packet if the destination address in the header of the packet is recognised (page 16, line 20 - page 17, line 5). A transmitter transmits only after receiving and seizing a token circulating at set times under the control of a token manager, and releases said token after the packet, including the trailer, has been sent and a seized token has been received (page 16, lines 10–19).

A disadvantage of the system disclosed by reference [3] is that, since the token is always only released after the transmission of a packet, there always elapses, between consecutively transmitted packets originating from different transmitters, a certain time interval which, as stated, takes up on average approximately 10% of the total transmission time available, with the result that the overlay network cannot be used efficiently. In addition, this reference does not disclose whether and, if so, how a transmitter can forward, by means of a request originating from a workstation having a receiver attached to the network at some other point, bulk data specified in said request to said receiver.

Reference [4] discloses a transmission system for transmitting data packets of still pictures from a central station having a picture data source selectively over a transmission line to one or more of a number of attached local receiving stations. The selectivity is achieved as a result of a dynamic addressing by the central station with the aid of logical channel numbers in the data packets which are assigned in advance in separate commands to the receiving stations concerned via the same transmission line. This known system has the drawback that it is not an interactive system. In addition, the communication concerning the picture data transmission and the transmission itself take place over the same transmission line. In order not to hold one another up, the data packets have to be relatively small, and this entails a large overhead in the case of pictures of some size.

B. SUMMARY OF THE INVENTION

The object of the invention is to provide an interactive communication and transport system for requesting, transmitting and receiving still pictures of the type indicated above, in which the transport path, namely a single picture channel is used as efficiently as possible for the picture data and is loaded as little as possible, with the result that waiting times can remain limited to a minimum for the users, even in a system of some size having various picture sources at different physical locations and a large number of requesting and receiving workstations. It achieves this object, first of all, by executing the transport over the relatively high-speed transmission path in a packet-switched mode in combination with an 'end of packet' detection of a packet to be transmitted next prior to the transmission at the transmitting end, with the result that permission to transmit a subsequent packet can already be given during the transmission of a packet immediately prior thereto. with the present invention, pictures; to be transmitted consecutively can be transmitted in a virtually gap-free manner.

The present invention achieves this object furthermore by combining packed-switched transmission of bulk data specified in a request, the actual picture data, in the case of a multiple picture data destination, with a form of dynamic addressing by assigning one and the same temporary destination code to all the destinations concerned. In this way it is possible to avoid compiling equally as many packets having the same picture as content but having different destination addresses and transmitting them consecutively.

Assignment of a similar temporary destination code to one or more specified workstations other than the caller, that is to say to a group of workstations, is also described as grouping. Such a grouping can be executed by supervisor means either on request prior to a picture request, or dynamically, if there are more or less simultaneous different requests for the same picture.

A packet-switched transmission of a picture including the "end of packet" detection at the transmission end can be very satisfactorily combined with supervisor means embodied, at least partially, in distributed form if the granting of the permission for transmitting a picture packet is executed by means of a modified token mechanism.

A further reduction in the loading of the picture channel can also be obtained by offering a caller the possibility of specifying the desired picture quality of a picture to be forwarded. The picture is transmitted over the picture channel with an appropriate bit rate for a specified picture quality.

C. REFERENCES

[1] van Leerdam, M. G. Herlaar, J. H.; Born, S.; de Lepper, P.A.P.H.:
ISLAND: A high speed optical LAN for integrated services,
Proceedings EFOC/LAN 88, Information Gatekeepers Inc., 1988, p. 414–419.

[2] PCT application WO 87/05767 entitled: Communication system having a control channel and an image channel.

[3] EP-A-0192795 entitled: Communication system comprising overlayed multiple-access transmission networks;

[4] GB-A-2171578 entitled: A still picture transmission apparatus.

D. BRIEF DESCRIPTION OF THE DRAWING

Figure 2:
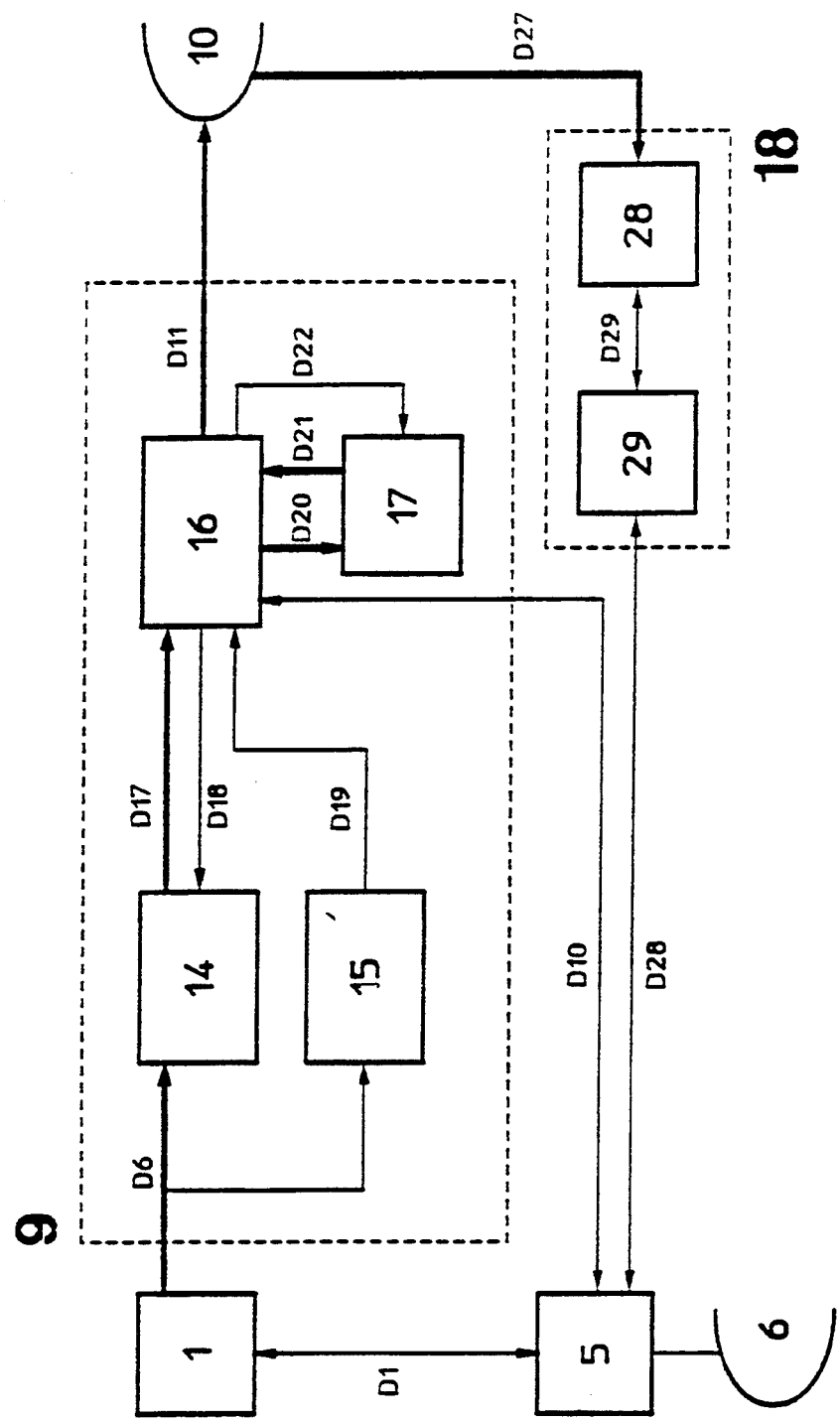
Figure 3:
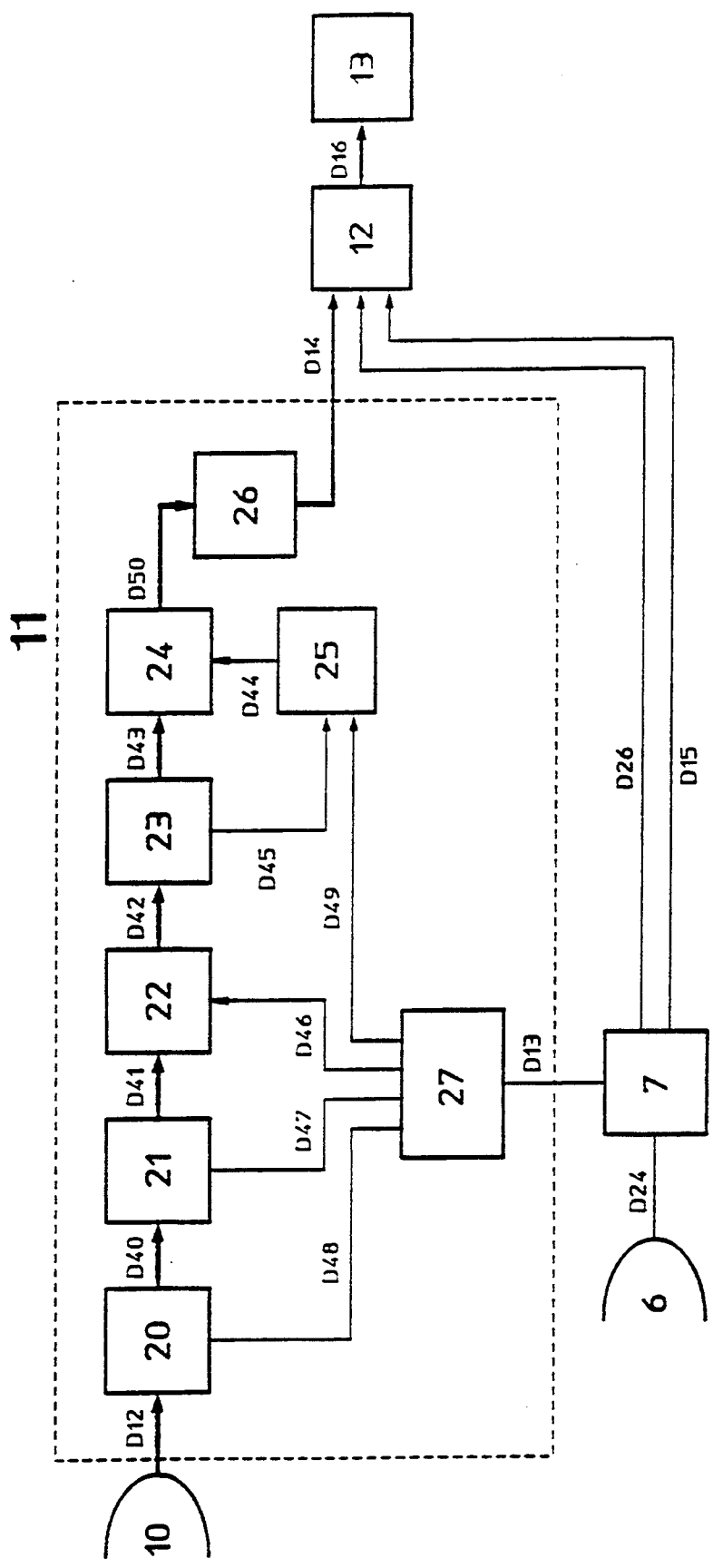

The invention will be explained in more detail by means of a description of an exemplary embodiment, reference being made to the drawing wherein:

FIG. 1: diagrammatically shows an overall arrangement of an interactive communication and transport system according to the invention;

FIG. 2: shows a more detailed diagrammatic elaboration of a transmitting workstation A according to FIG. 1;

FIG. 3: shows a more detailed diagrammatic elaboration of a receiving station B according to FIG. 1.

Figure 4:
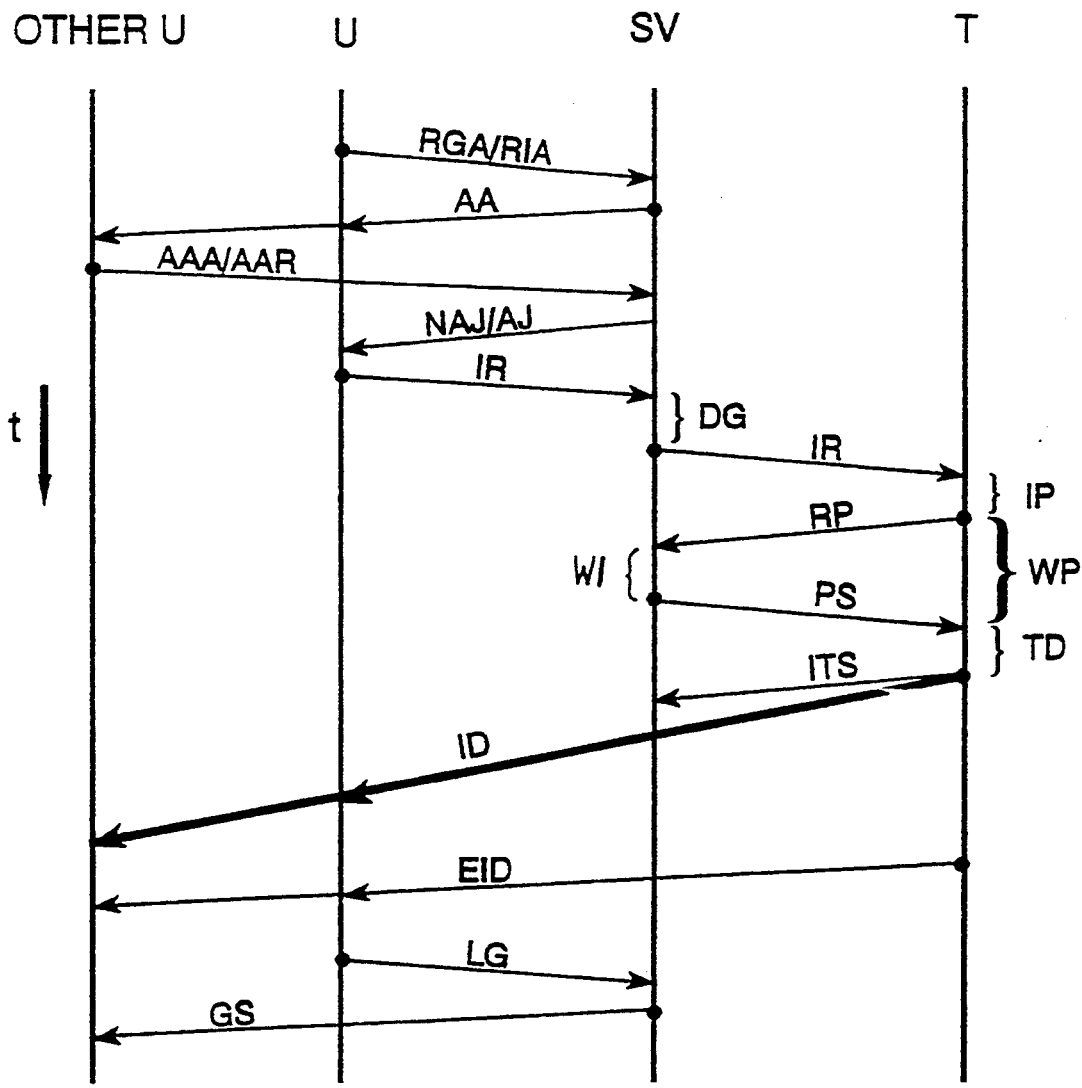
Figure 5:
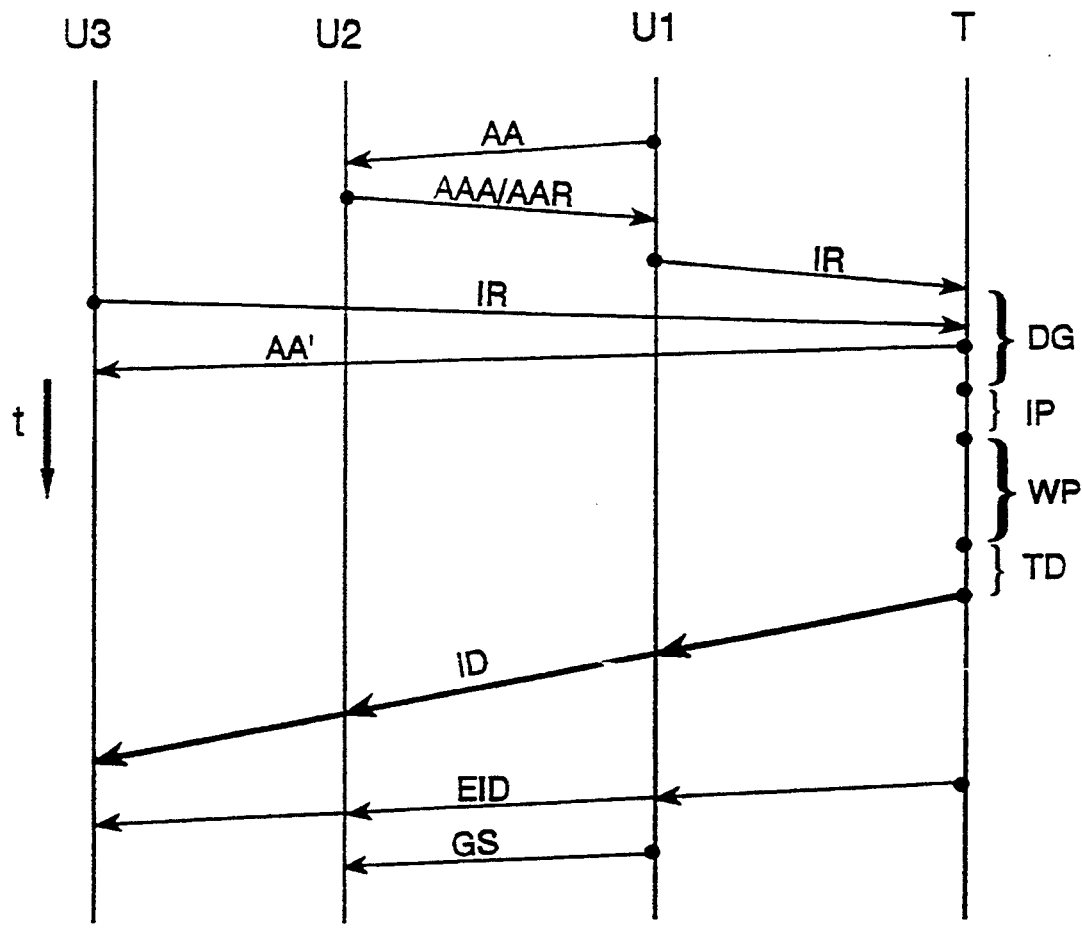
Figure 7A:
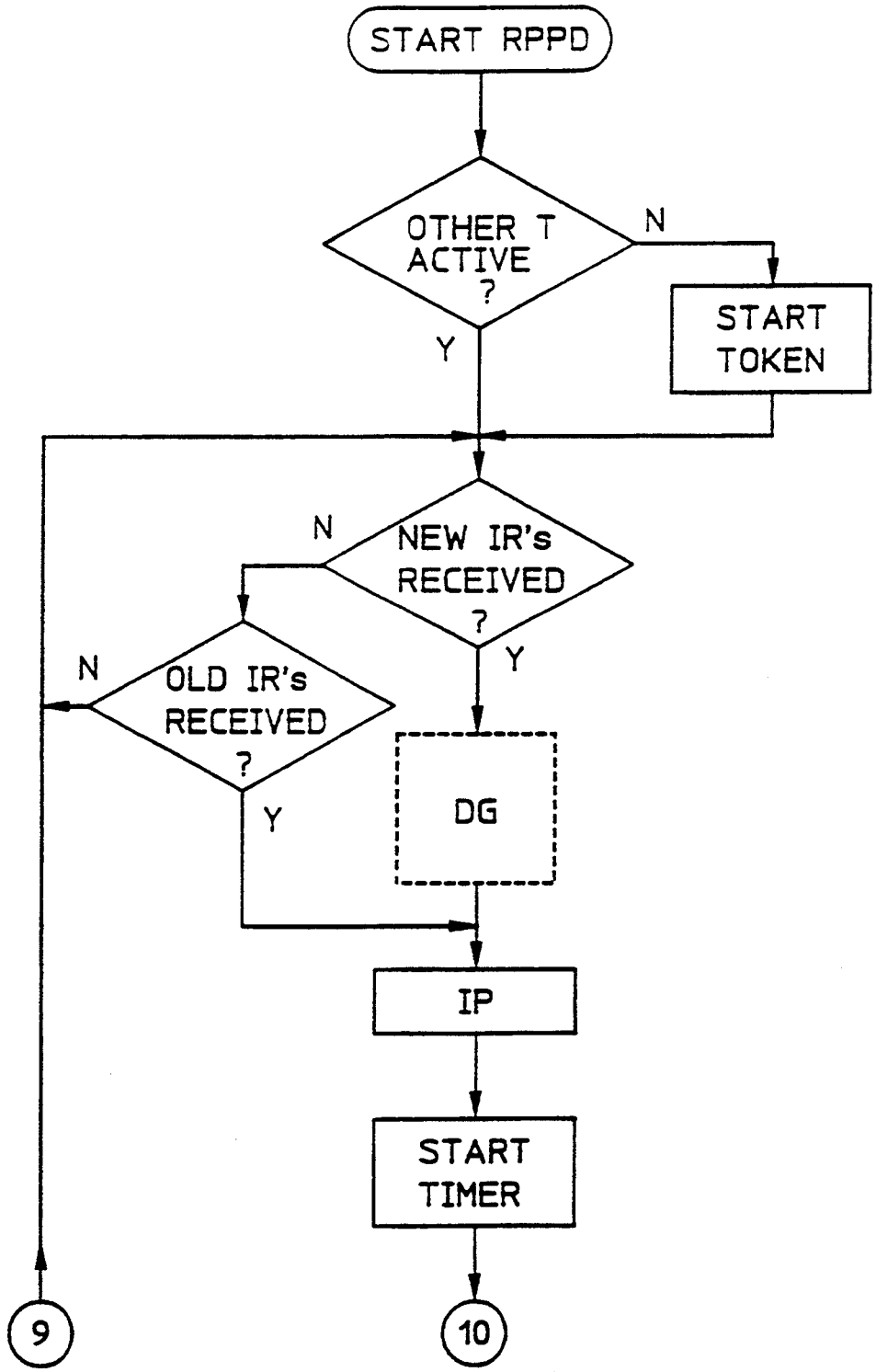
Figure 7B:
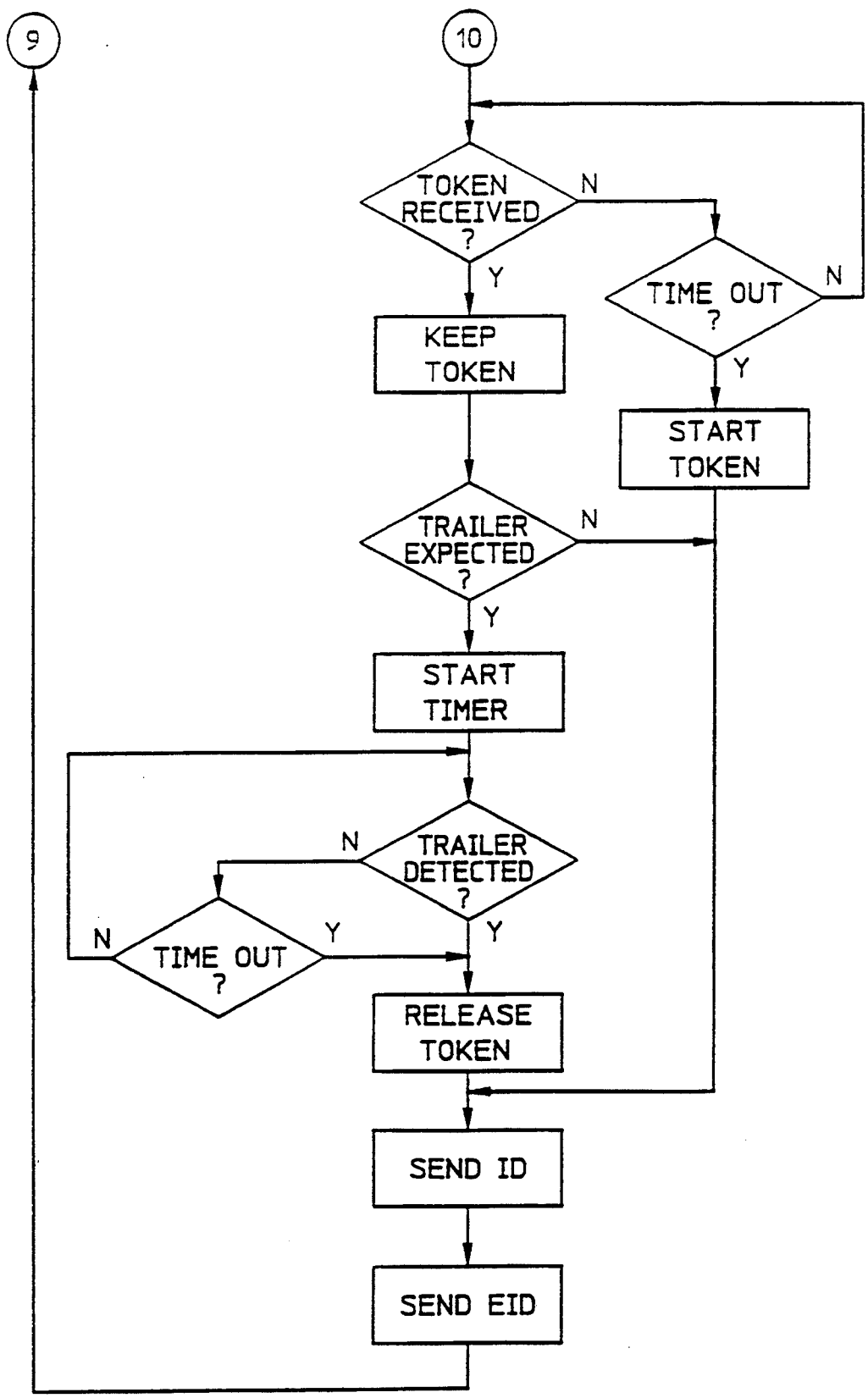
Figure 7C:
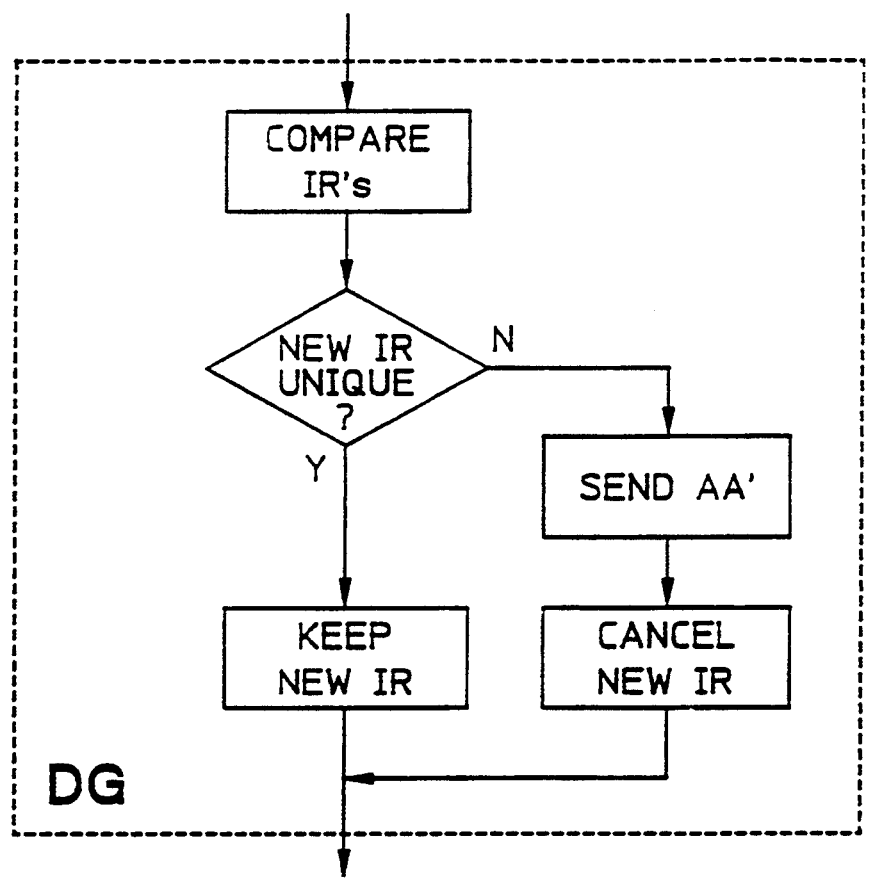

FIG 4: shows a protocol diagram of a picture request for a centrally executed supervisor function;

FIG. 5: shows a protocol diagram of a picture request for a locally executed supervisor function;

FIG. 6: shows a flow chart of the user program in a requesting receiving station B having the components FIGS. 6a, 6b, and 6c and 6d;

FIG. 7: shows a flow chart of the request-processing program in a transmitting station A having the components FIGS. 7a, 7b and 7c.

E. DESCRIPTION OF AN EXEMPLARY EMBODIMENT

Let it first be remarked in relation to the figures, which form part of the drawing, that all the signal connections shown in the FIGS. 1-3 between the various components of the system to be described, regardless of their type, are indicated by the letter D followed by a serial number. Furthermore, all those signal paths along which the actual picture information is transmitted from one component of the system to the other are emboldened.

FIG. 1 shows the overall system arrangement of an interactive communication and transport system for still pictures according to the invention. As still picture sources, exemplary embodiment, four Laser Vision Players (LVP) are indicated by 1, 2, 3 and 4. With such a known LVP, around 54,000 still pictures can be requested from a video disc suitable therefor. In the context of the invention, the concept still picture also includes, however, the separate pictures of a sequential series of what are familiarly termed moving pictures. In that sense, a video camera may therefore also serve as a still picture source. Which picture has to be retrieved is transmitted via a personal computer (PC) 5 by means of a picture search instruction to the LVPs 1, 2, 3 or 4 via signal connections D1. D2, D3 and D4, respectively. Via the connections D1, D2, D3 and D4, information can be transmitted to the PC 5 about the status of the LVPs. The PC 5 is attached via a signal connection D5 to a network 6, via which network the PC 5 has a data communication connection having a relatively low transmission speed to other personal computers, such as 7 and 8, attached to the network 6 via signal connections D24 and D25, respectively. The network chosen may, for example, be a local area network (LAN) known per se, possibly having a ring structure as in the system described in reference [1]. Retrieved picture information from the LVPs 1, 2, 3 and 4 is presented to a high-speed transmitter 9 via signal connections D6, D7, D8 and D9, respectively. The process of requesting specified picture information by means of a picture search instruction from the PC 5 to an LVP and the presentation of said picture information is known per se and is therefore not described here in greater detail. For each picture, said high-speed transmitter 9 packages the picture information received, the picture data, in a data packet provided with a header, a destination address, information about the picture data, the actual picture data, and a trailer. To receive the destination address, the transmitter 9 has a signal connection D10 to the PC 5. The high-speed transmitter 9 is attached via a signal connection D11 to a network 10 for data transport at a relatively high transmission speed. An overlay ring as also described in reference [1] in which a special channel is reserved for the data transport of still pictures may, for example, be chosen as such a high-speed network. Hereinafter this special channel will be denoted by picture channel 10. Attached to said picture channel 10 are one or more high-speed receivers 11 via equally as many signal connections D12. Still other high-speed transmitters 9 may also be attached thereto. Each receiver 11 has a signal connection D13 with a PC 7 via which an assigned destination address (see below) can be transmitted. In the receiver 11, the signal connection D12 to the picture channel 10 is continuously scanned to see whether a data packet is being transmitted with the destination address. If this is the case, said data packet is read and the picture information therefrom is transmitted via a signal connection D14 to a picture mixer 12. Picture information originating from the PC 7 may also be presented to the picture mixer 12 via a signal connection D15. Under the control of the PC 7 by means of control signals via a signal connection D26, a mixed picture may be delivered to a monitor 13 via a signal connection D16 by the picture mixer 12. That is to say, with the aid of said picture mixer 12 a stationary picture originating from one of the LVPs 1, 2, 3 or 4 can be made to appear at a particular position or even completely on the screen of the monitor 13.

Hereinafter a PC to which a high-speed transmitter such as 9 and a still picture source such as an LVP are added, will be called a request-processing station or a transmitting station A, indicated in FIG. 1 by a dotted rectangle A; and a PC to which a high-speed receiver such as 11 is added, will be called a requesting workstation or a receiving station B, indicated by a dotted rectangle B. Said workstations and their operation during a request for a stationary picture will be described in more detail below.

Let it also be pointed out here that, if preference is given to two monitors in a receiving workstation B, the picture information of the receiver 11 can be passed directly to the monitor 13 via the signal connection D14. In that case, the signal connection D15 is then connected to a second monitor and the picture mixer 12 can be omitted.

Of course, it is possible for a workstation to comprise both a transmitter 9 with associated still picture source and receiver 11.

With more than one transmitting station A connected to the picture channel 10, each transmitting station also comprises a scanner 18 which is connected by a signal connection D27 to the picture channel 10 and by a signal connection D28 to the PC 5. Said scanner 18 continuously scans the signal connection D27 and detects when the transmission of a data packet has been terminated. Whenever a trailer is detected after detecting a header of a data packet, a 'free for transmission' signal is transmitted via the signal connection D28 to the PC 5.

In FIG. 2, a transmitting station A, in particular the transmitter 9 therein, is elaborated in more detail. Only LVP 1 is indicated as source of still pictures. In this example, it is assumed that this is a source based on analog video signals. The LVP 1 is connected via the signal connection D1 to personal computer 5. The analog video signal originating from LVP 1 is presented via the signal connection D6 both to a coder 14 and to a synchronisation separator 15. The coder 14 converts the analog video signal into a digital picture signal. Said coder has an adjustable bit rate and is preferably of the Delta Sigma coder type. The digital picture signal produced by the coder 14 is presented via a signal connection D17 to a packet assembler 16. Said packet assembler 16 first places said digital picture signal in a transmitter memory 17 via a signal connection D20 before assembling a data packet therefrom. During the assembly, the packet assembler 16 also performs a bit stuffer function in order to prevent 'header' simulation in the packet. The synchronisation separator 15 determines the period of time during which the LVP 1 delivers a video signal with picture information of precisely one picture. A signal corresponding to said period of time is transmitted via a signal connection D19 to the packet assembler 16. Another function which is incorporated in the packet assembler 16 is the generation of a bit rate clock signal for the coder 14. Said bit rate clock signal is fed to the coder 14 via a connection D18. By altering the bit rate, the coder can be software-adjusted, for example to a value situated between 35 and 200 Mbit/sec depending on the desired quality of the stationary picture to be transported. In this connection, it is, of course, true that, as a higher bit rate is adjusted, the period of time of the transport of a single picture is longer for a given transmission speed of the transmission path via the picture channel 10, for example at 70 Mbit/sec. The desired bit rate is therefore dependent on the application.

The presence of the transmitter memory 17 makes it possible for the digital picture signal to be placed in the memory at a speed, for example a higher speed of 140 Mbit/sec, other than the speed at which said picture signal has to be read out (in this case 70 Mbit/sec) of the memory again via a signal connection D21 for the purpose of transport over the transmission path via the picture channel 10. The information necessary for the purpose of reading in and reading out the transmitter memory 17 is transmitted to the transmitter memory 17 via a signal connection D22 by the packet assembler 16. The actual transmission of a packet takes place under the control of the PC 5, for which purpose signals are exchanged with the packet assembler 16 via the signal connection D10.

A packet assembled by the packet assembler 16 has, for example, the following structure:
- a field for a header containing 2 bytes at bit positions,
- a field for a destination address containing 1 byte at bit positions,
- a field for a length indication (in bits or bytes) of what is hereinafter to be called the picture data field containing 3 bytes at bit positions,
- a field for the actual picture data containing the number of bit positions indicated in the field for the length indication, and a field for a trailer containing 2 bytes at bit positions, and specifically in the sequence indicated here.

The scanner 18 comprises a detection circuit 28 for detecting a header and a trailer of a packet. The detection circuit 28 continuously scans the data flow appearing at the signal connection D27 to the picture channel 10 for a bit series which can be recognised as a header or as a trailer of a packet. If a header or a trailer is detected by the detection circuit 28, this is transmitted to the memory circuit 29 via a bidirectional signal connection D29. The header and trailer patterns to be detected are stored in said memory circuit and are transmitted to the detection circuit 28, for example, during a start-up procedure. On detecting a header, the memory circuit 29 emits a 'not free for transmission' signal and on detecting a trailer, it transmits a 'free for transmission' signal to the PC 5 via the signal connection D28. Only when the last signal emitted is the 'free for transmission' signal, can PC 5 issue an instruction to transmit a packet.

In FIG. 3, a receiving workstation B (see FIG. 1) is elaborated in more detail, and specifically the high-speed receiver 11 therein. Said receiver comprises a detection circuit 20 for detecting a header or trailer of a packet. For this purpose, said circuit continuously scans the data flow appearing at the signal connection D12 to the picture channel 10 for a bit series which can be recognised as a header or as a trailer of a packet. If a header or a trailer is detected by the circuit 20, this is transmitted via a bidirectional signal connection D48 to a control circuit 27. For this purpose, the detection circuit receives in advance the header and trailer to be detected from the control circuit 27. After a header has been detected, the information is then transmitted via a signal connection D40 to a bit destuffer 21 which again restores any bit series in the transmitted information which have been stuffed by the high-speed transmitter. For this purpose, the bit destuffer 21 receives the stuff word from the control circuit 27 via a signal connection D47. Stripped of the header and the stuff bits, the packet is transmitted via a signal connection D41 to a check circuit 22, which circuit checks whether the destination address present in the packet corresponds to a destination address under which the receiving station B is addressable at that instant for data packets via the picture channel 10. Said destination address may be a permanently or semipermanently assigned address which is assigned when the system is started up. Said destination address is, however, preferably temporary, that is to say, dynamic, assigned for the period of forwarding of only one or of a limited number of data packets. Such a temporary destination address may, for example, be assigned to the receiving station B in a data communication via the network 6 between the PC 7 of the receiving station B and another PC of another workstation attached to the network to which a so-called supervisor function has been added. See below. The PC 7 transmits said station address via signal connection D13 to the control circuit 27 and the latter transmits it in turn via a signal connection D46 to the check circuit 22. If the station address corresponds, the packet is transmitted without header, stuff bits and destination address via a signal connection D42 to the stripping circuit 23 which strips the start of the packet of the other information relating to the actual picture data and which stores said information but also transmits it via a signal connection D45 to a memory addressing circuit 25. The actual picture data is then transmitted from the stripping circuit 23 via a signal connection D43 and is placed in a receiver memory 24 under the control of the memory addressing circuit 25 exerted via a control connection D44. If the complete picture is read in, that is to say, if equally as many picture data bits have been read into the receiver 11 and counted by the memory addressing circuit 25 as the length indication in the respective field of the packet indicated, a trailer should be detected, if the picture has been transmitted well, by the detection circuit 20. The result of said detection is transmitted via the signal connection D48 to the control circuit 27. Said control circuit 27 transmits this in turn via the signal connection D49 to the memory addressing circuit 25. If the total picture information is stored properly in the receiver memory 24, it is then periodically read out of the receiver memory 24 at the correct frequency and fed via a signal connection DS0 to a decoder 26. For the benefit of the decoder 24 the read-out speed must, of course, be matched to the bit rate which has been used at the transmitting end in a transmitter 9. If the decoder is of a type corresponding to the Delta Sigma coder used at the transmitting end, said matching takes place automatically. If another type of coder having an adjustable bit rate has, however, been used at the transmitting end with a corresponding decoder 26 which does not have the possibility of automatic matching to the bit rate, the latter will have to receive in addition a separate bit rate clock signal for the correct adjustment. This variant has not been elaborated further in this exemplary embodiment. The decoder 26 supplies an analog video signal which can be displayed via the signal connection D14 to the picture mixer 12 and from the latter via the signal connection D16 on the screen of the monitor 13.

The system according to the invention incorporates a supervisor which regulates the sequence in which the different transmitters (one or more than one) can transmit the packets of the requested pictures 10 and furthermore can assign temporary destination addresses to the receivers 11 of the receiving stations B. These destination addresses apply exclusively to the picture channel 10 and must be distinguished from the station addresses of the various workstations connected to the network 6. By assigning one and the same temporary destination address to more than one receiver, users of the workstations having said receivers can be grouped in a simple way, so that a picture can be forwarded simultaneously to a group of users by means of only one request. Said supervisor functions can be executed either centrally or locally. The central execution will be explained broadly with reference to FIG. 4. The local execution, in which the execution of the supervisor functions is distributed over the system, will be described in more detail with the aid of FIGS. 5 to 7 inclusive. In particular the distributed execution fits well into a LAN environment, where all the functions of the supervisor can, in principle, be distributed over all the connected stations. As a result of the absence of a central station, a greater degree of operating reliability can then be expected.

FIG. 4 shows a protocol diagram of the requesting of specified picture data by a user U from a PC connected to the network 6, for example the PC 7 of the receiving station B, from a PC of a transmitting station T connected to the network 6, for example the PC 5 of the transmitting station A, the supervisor function being executed centrally by a supervisor program SV added to any PC connected to the network 6, for example PC 8 or also PC 5 (see FIG. 1). If the user U wishes to request a picture for himself and/or other users, denoted by OTHER U, from the picture source added to the transmitting station T, he starts a 'still picture' application SPA in the PC 7 appropriate to this source. In the transmitting station T there is a request processing program RPP corresponding to the application SPA. It is assumed that, as a result of initialisation procedures known per se directly after the start, every application SPA and every request processing program RPP are already conversant with the addresses (in the network 6) of all the transmitting stations having the picture sources concerned and of the PC to which the supervisor program SV has been added. The protocol diagram of FIG. 4 shows by means of arrows provided with a code which communication and data are exchanged in which sequence for the purpose of a picture request between the level of the user U, the level of the supervisor SV and the level of the transmitting station T. These levels are shown by vertical lines with the appropriate letter code U, SV and T.

The codes added to the arrows correspond to messages forwarded in accordance with the direction of the arrow over the network 6 in a format valid for the network, but with the exception of the code associated with the emboldened arrow, which corresponds to the transmission of the actual picture data over the picture channel 10. The codes alongside the arrows have the following meaning:

*RGA Request For Group destination Address

Simultaneously transmitted information: station address of caller and group list with addresses of stations for which the request is being made;

RIA Request for Individual destination Address

Simultaneously transmitted information: station address of caller;

AA Address Assignment

Forwarded to: caller and any station having an address in the group list;

simultaneously transmitted information: destination address DA to be assigned

*AAA Address Assignment Accepted

Forwarded by: station having an address in the group list;

*AAR Address Assignment Refused

Forwarded by: station having an address in the group list;

*NAJ Not All stations will Join

Simultaneously transmitted information: list of addresses of stations which have not accepted;

*AJ All stations will Join

IR Image Request

Simultaneously transmitted information: picture specification (picture number), station address of transmitter, destination address DA assigned, picture quality code;

RPS Request for Permission to Send

PS Permission to Send

ITS Image Transmission Started

ID Image Data

Forwarded via the picture channel 10 (bold arrow); simultaneously transmitted information: packet header, destination address DA assigned, the actual picture data, packet trailer;

EID End of Image Data ('broadcast' message)

Simultaneously transmitted information: destination address assigned

*LG Leave Group

*GS Group Stopped

The codes alongside the braces:

*DG Dynamic Grouping

IP Image packet Preparing

WP Waiting for Permission to send

TD Trailer Detection

The codes preceded by an * relate exclusively to grouping.

A complete picture request proceeds as follows. The application SPA of a user/caller U requests a destination address from the supervisor SV. With a RIA message, this takes place individually, solely for his own receiver. With an RGA message, this takes place for a group of users, including himself, if the user/caller wishes to group. The RGA message is accompanied by a list of station addresses of stations having receivers to which the user/caller wishes to arrange for one or more pictures to be requested thereafter to be forwarded. The supervisor selects a destination address DA and then sends an AA message accompanied by the selected destination address DA to each station address specified in the request for a destination address. The AA message announces the assignment of the selected destination address DA. Every station other than that of the user/caller U is represented in the figure by the level OTHER U. In the individual case, the actual picture request can be made immediately after this. In the grouping case, every station has to react with an AAA message or an AAR message, respectively, if the assignment of the group address is accepted or, alternatively, refused. The result of this assignment is then communicated by the supervisor SV to the user/caller U by means of an AJ message if all the stations have accepted the destination address DA, and by means of an NAJ message if at least one of the stations has not accepted the destination address DA. The NAJ message is accompanied by a list of the station addresses which have not accepted the assignment of the destination address DA so that the user/caller U can assess whether there is any point in forwarding to a limited group. In every station which has accepted the assignment of the destination address, internal communication ensures that said assigned station address is transmitted via the control circuit 27 to the check circuit 22 (see FIG. 3). The actual picture request is made with an IR message to the supervisor SV. Said request IR contains the picture specification (picture number), the station address of the transmitting station, the destination address DA assigned and an image quality code. The supervisor SV places every new picture request in a queue and investigates whether grouping can be carried out dynamically, denoted in the figure by DG (brace). See below. Once this has been done, if it is its turn and the SV has confirmed, for example by means of an RPS message, that the transmitting station concerned is ready to receive a new picture request, the picture request IR is transmitted by the supervisor SV to the transmitting station T specified in the request.

In the transmitting station T, the request is processed and executed up to and including the stage in which the picture packet is ready for transmission in the transmitter memory 17 (see FIG. 2) of the workstation. The preparation of a picture packet implies that the request processing program RPP first issues a picture search instruction for the specified picture to the LVP concerned and then transmits the station address and the picture quality code to the packet assembler 16. The packet assembler 16 then transmits the picture quality code as a bit rate adjustment signal via the signal connection D18 to the coder 14. If the picture has been found and is then presented by the coder 14 over the connection D17 in digitised form, the packet assembler 16 can assemble a complete packet therefrom and hold it ready for transmission in the transmitter memory 17. This preparation is denoted in FIG. 4 by IP (brace). If the picture packet is ready this is signalled via the signal connection D10 to the request processing program RPP in the PC 5. Then permission is requested from the supervisor SV by means of an RPS message for transmission of the package which is ready over the picture channel 10. In the meantime the supervisor transmits any subsequent request for the same transmitter. The awaiting of the permission is denoted by WP (brace). The supervisor gives this permission by means of a PS message. After receipt of the PS message, 'end of packet' detection takes place, which is denoted in the figure by TD (brace). That is to say, a check is made on what the last signal emitted on the signal connection D28 is in the manner described with the aid of FIG. 2. If it is 'not free for transmission' the first subsequent signal is awaited. If it is 'free for transmission', the request processing program RPP arranges that the instruction for transmission is given by the signal connection D10 to the transmitter 9. The supervisor SV is also informed by means of an ITS message that the transmission has started. The supervisor SV only emits a PS message to the transmitter concerned for a picture packet to be transmitted subsequently if it has received an ITS message as a response to the previous PS message. Any waiting time in between is indicated in the figure by WI (brace). The actual picture data ID is transmitted via the picture channel 10 with a bit rate appropriate to the quality code and contains the information indicated above. Once transmission has been completed, an EID message in the form of a broadcast message is sent over the network 6 from the transmitting station T and also contains the assigned destination address of the picture packet last transmitted so that every receiving station involved (OTHER U level and U level) can detect that the picture transmission has been terminated.

If the user wishes to dissolve the group assembled at his request, he sends an LG message to the supervisor SV. The latter then sends a GS message with the destination address assigned to said group over the network 6 in order to inform the receiving stations involved with said group that said destination address is no longer valid and that from that instant they can again accept a new destination address. The GS message is either dispatched specifically to all the stations belonging to the group or as a broadcast, depending, however, on the size of the group involved.

The fact that, when requesting a picture, a user is also given facility for specifying a desired picture quality is based on the following consideration. If a still picture source consulted via the system is of a type such that users, as it were, 'leaf it through' until a particular picture has been found which is examined more closely, it is not necessary to transport all the pictures with the same high quality. As a result of being able to choose a lower quality, under which circumstances the coder 14 is set to a correspondingly lower bit rate, the waiting times for the user will become shorter and the transport medium will be less heavily loaded. Once the picture sought has been found, said picture can still be requested and forwarded with higher quality.

Another possibility is that the supervisor functions are distributed over all the workstations which are connected to the picture channel 10. An example of such a distributed form of supervisor functions is described below in conjunction with a token passing protocol. In order to implement all the supervisor functions in the system, every workstation has to execute its share in said functions from its position in the system. This share is different for a user U than for a transmitter T. The address assignment for the purpose of grouping at the request of a user is now executed by the 'still picture' application, denoted in the distributed embodiment by SPAD, of each user himself and the address assignment for the purpose of dynamic grouping by the request processing program, denoted in the distributed embodiment by RPPD, of each transmitting station. Here again it is assumed that every SPAD application and every RPPD request processing program, along with the addresses (in the network 6) of all the (active) transmitting stations having the picture sources involved, are already known as a result of initialisation procedures known per se immediately after the start. Every receiving station then also has its own destination address (ODA) for the picture channel and this is always used if no grouping takes place at the initiative of other stations. Permission to transmit a picture packet which is ready and waiting over the picture channel 10 is always granted by means of a special token message. Said token message, or token for short, is a short broadcast message which is in fact continuously transmitted to every active station in the network 6 but its content is a bit pattern which is only recognisable to active transmitting stations. Said token is seized only by a transmitting station if it has a picture packet ready and waiting for transmission and is only released again when the transmission has started. In the present exemplary embodiment, the token is 'seized' and 'released' by retaining or transmitting the token, respectively. Every transmitting station which establishes on initialisation that no other transmitting station is as yet active, or any transmitting station which wishes to start to transmit and does not receive a token within a specified time, generates the token itself. FIG. 5 shows a protocol diagram for an exemplary embodiment having a distributed supervisor function. The codes used in this have in principle the same meaning as identical codes in FIG. 4. By way of example, the levels are shown of a transmitting station T and three users U1, U2 and U3. If user U1 wishes to group with user U2 for a picture request IR from transmitting station T, user U1 sends an AA message with a destination address DA1, to be assigned, to the user U2 prior to the picture request and waits for its response message AAA or AAR. If there are still other users Ui with whom the user U1 wishes to group, said address assignment procedure must be executed for each of said other users. The user U1 then sends his picture request IR, including the destination address DA1 assigned by him, to the transmitting station T. The request processing program RPP active therein places said request in a queue, continuously investigates whether dynamic grouping is possible if more than one request is present in the queue by comparison with other picture requests in the queue, executes said dynamic grouping if possible, gives a picture search instruction to the LVP concerned as soon as it is the turn of the picture request, waits for the token as soon as the picture has been found and is ready and waiting in a picture packet provided with the destination address DA1 in the transmitter memory 17, carries out an 'end of packet' detection as soon as the token has been received, gives an instruction for the transmission of the picture packet as soon as the 'free for transmission' signal is detected, and transmits the token. The actual transmission of the picture packet to level U1 and proceeding to level U2 is indicated by a bold arrow ID. This indicates that, since the users U1 and U2 have the same destination address DA1 for the picture channel 10 at that instant, said picture packet just transmitted can be received in their respective receivers. Once the transmission has been completed in the transmitting station T, it communicates this to the stations in the network 6 involved by means of a broadcast message EID. The user U1 can dissolve the group assembled by him again by means of a GS message.

IP (brace) in the T level again indicates the process of requesting and preparing the picture packet specified in the request until it is ready and waiting for transmission. If a picture request is received from user U3 having a destination address DA3 but the same picture specification before the IP process, a dynamic grouping DG (brace) is used for said request. This implies that an address assignment message AA' containing the same destination address as is valid for the picture request from user U1, i.e. destination address DA1, is forwarded to the user U3 by the RPPD program in the transmitting station T. The AA' message differs from the AA message described above in that it originates from a transmitting station and implies that the application program at the user side (user U3) may use the destination address DA1 exclusively for the next picture packet having said destination address, and that response with an AAA or an AAR message is now unnecessary. For every subsequent picture request from the user U3, the destination address DA3 cited in his picture request is then valid again unless said picture request is also subjected to a dynamic grouping. If the picture request from user U3 also relates to a group, a copy of the AA' message is transmitted from the station of the user U3 to each of the stations of said group.

Once the picture packet is ready and waiting for transmission, that is to say after IP, permission for the transmission thereof has to be awaited and then an 'end of packet' detection has to be executed again, indicated in the figure by WP and TD, respectively.

Figure 6A:
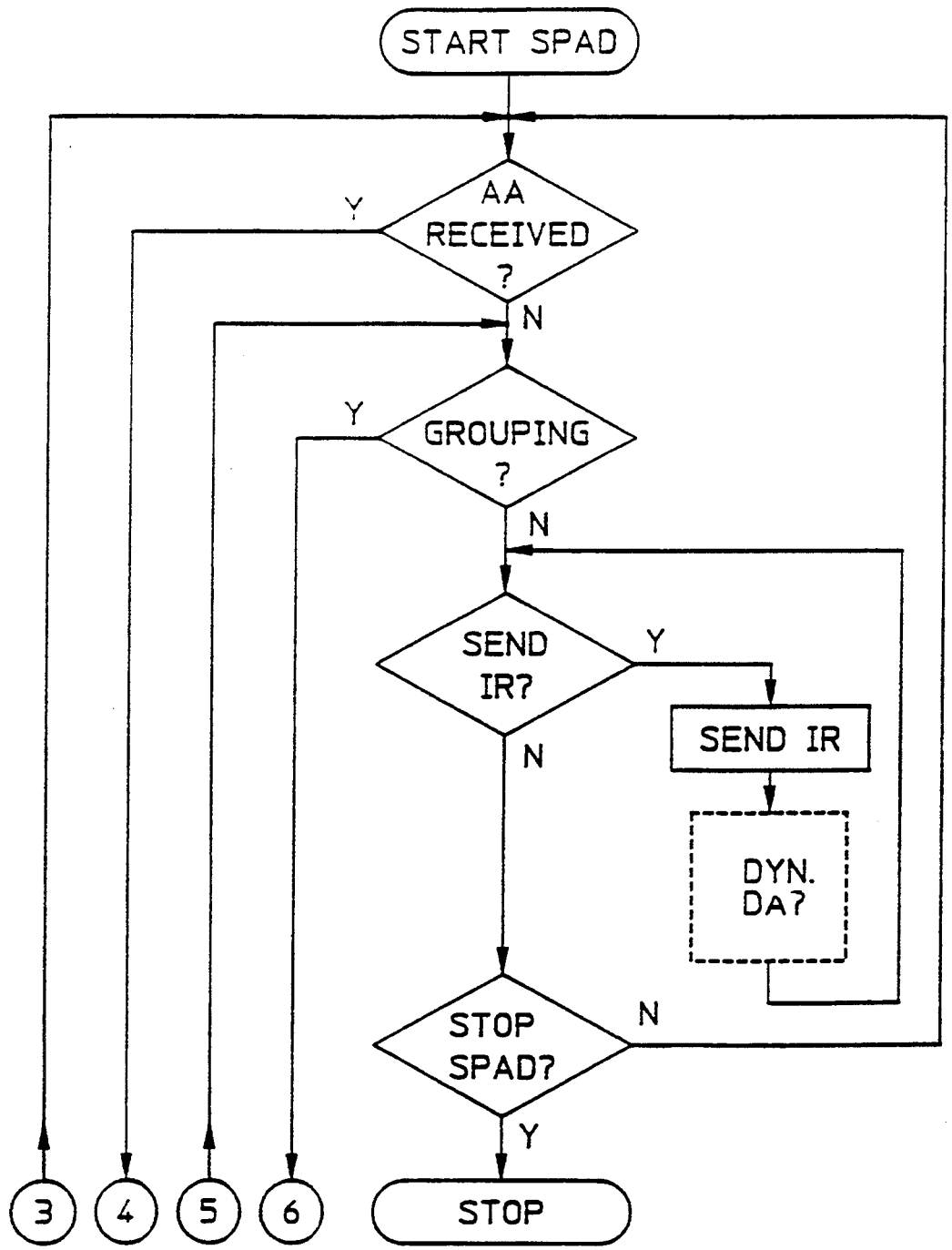

FIG. 6, with the component FIGS. 6a up to and including 6d shows a flow chart of the SPAD program present in a requesting receiving station B. The mutual connection between said component figures is formed by correspondingly numbered connection circles. After the start-up START, including the initialisation procedure indicated above, four states are always checked consecutively, namely:

AA RECEIVED? has an AA message been received? If not, then:
GROUPING? does the user wish to group? If not, then:
SEND IR? is there a picture request IR to be transmitted? If not, then:
STOP SPAD? Does the SPAD program have to be stopped? If so, it is stopped; if not, the four states are checked again.

Figure 6B:
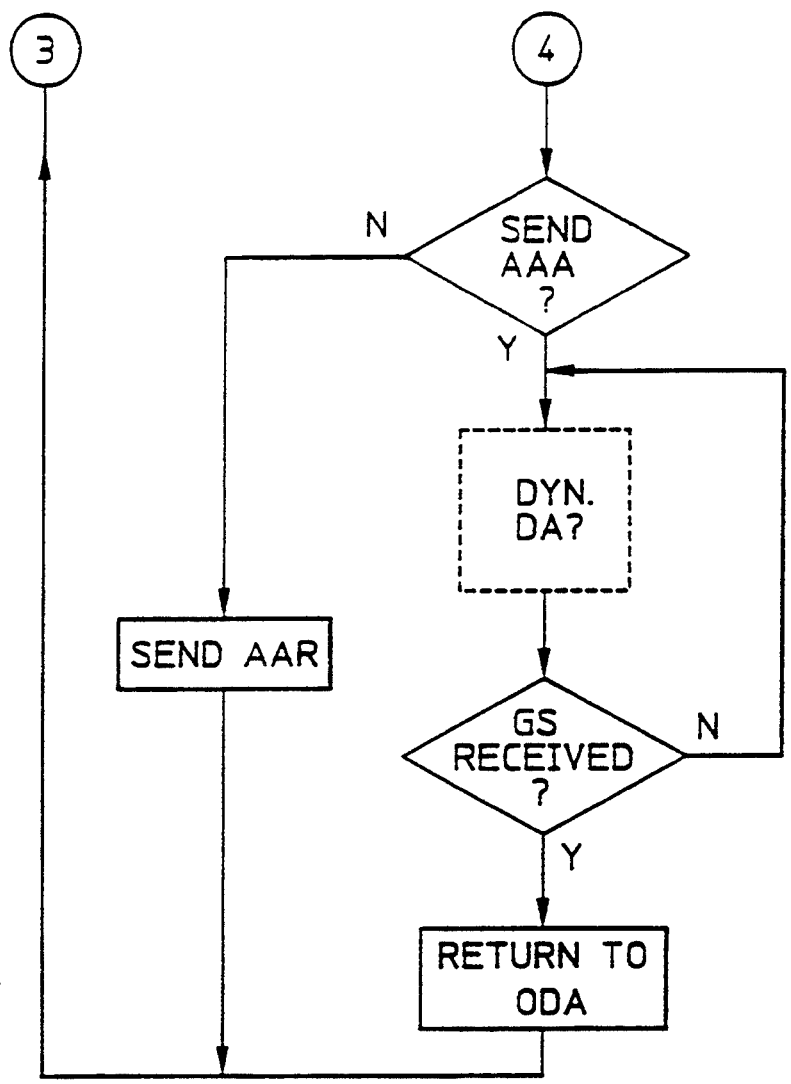
Figure 6C:
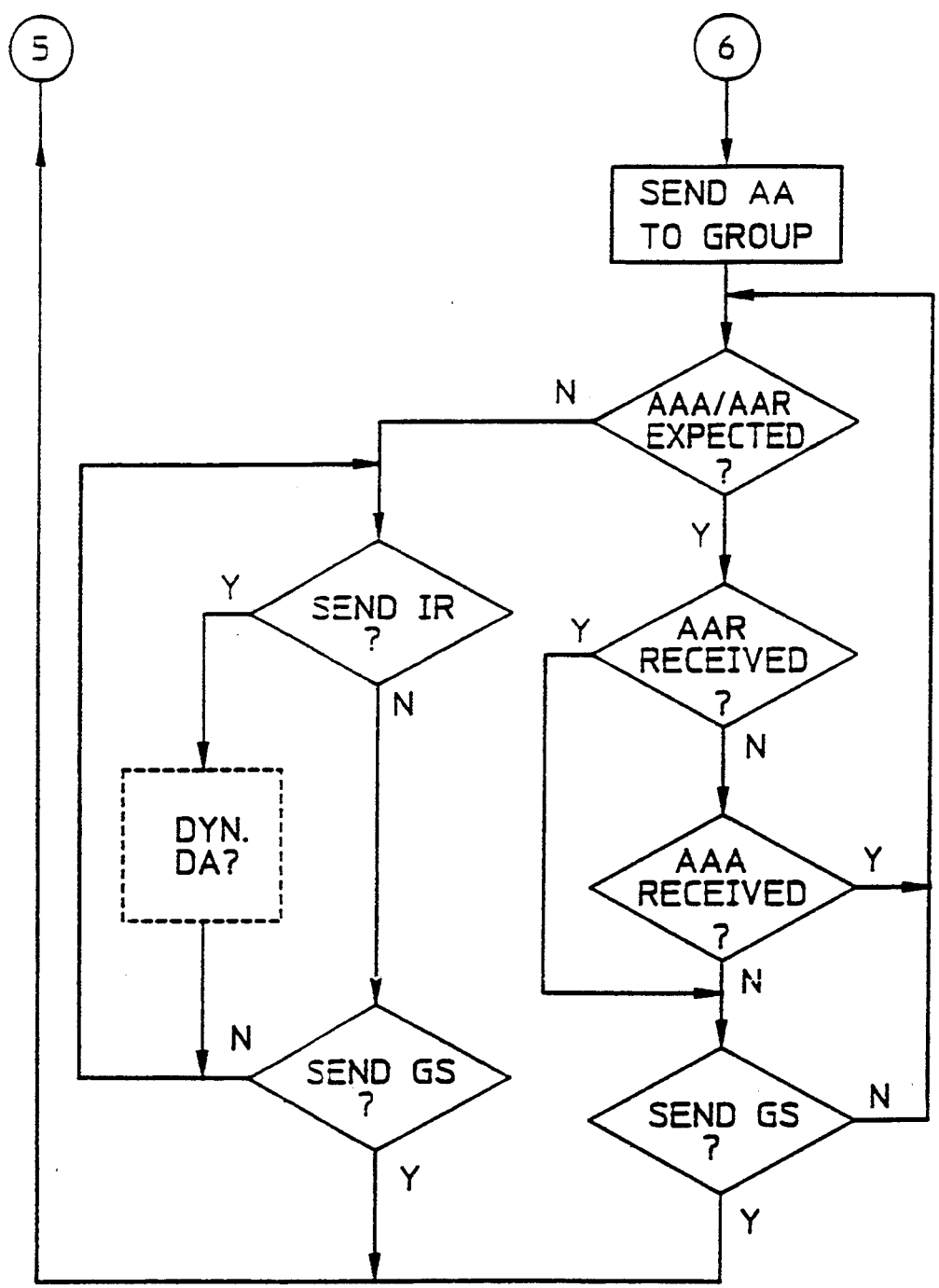
Figure 6D:
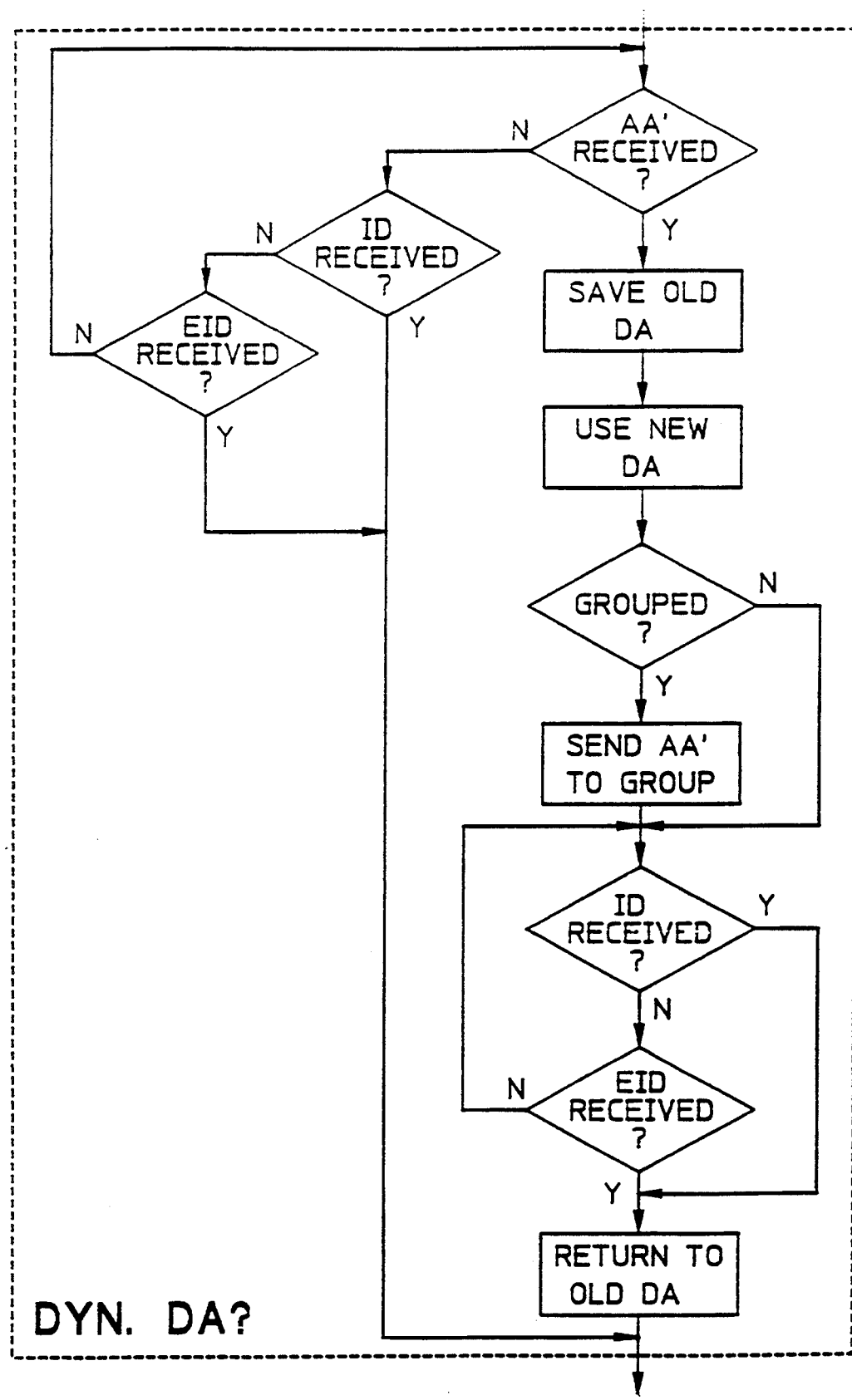

If an AA message has in fact been received, this means that a request has been received to group concomitantly originating from a user of another receiving station. The process which is then executed is shown in FIG. 6b (see description below). If the user himself wishes to group, the process shown in FIG. 6c is executed (also see below). If a picture request IR is in fact to be transmitted, it is transmitted with the individual destination address ODA. However, it is then always necessary to check whether the picture packet forwarded by the transmitting station involved in response to said request will be forwarded with the destination address DA cited in the request or with a dynamic destination address DDA which has been assigned by the transmitting station in connection with a dynamic grouping by means of an AA' message. This process, DYN.DA?, including waiting until the picture forwarding has been completed, is shown in FIG. 6d (see below). Once that has been completed, the state SEND IR? is checked again, that is to say, whether there is again a picture request IR to be transmitted.

FIG. 6b shows the process which is executed if an AA message is received with the request to take part in a groupwise picture forwarding under a group destination address GDA cited in the message. Preferably, said group destination address GDA is identical to the individual destination address ODA of the station from which the AA message received originates. If the user of the SPAD application wishes to take part in said group under said GDA address, the AA message concerned is answered with an AAA message. It is then necessary to await the picture forwarding in accordance with the process DYN.DA? shown in FIG. 6d. Once this has been completed, a check is made on whether a GS message has been received in the meantime, indicating that the groupwise forwarding has been terminated. If not, a picture forwarding is again awaited; if so, the individual destination address ODA is valid again, and the first of the four states AA RECEIVED?, is again investigated. If the user does not wish to group concomitantly, for example if he is already taking part in another group, an AAR message is sent as a reply, and the first of the four states AA RECEIVED?, is again investigated.

FIG. 6c shows the process which is executed if the user wishes to group himself. First of all, AA messages with the destination address ODA are forwarded to all the station addresses in the group list assembled by the user in interaction with the SPAD program. Then, while AAR or AAA messages are being awaited as a response thereto, an investigation is made of whether such messages have been received. Whenever an AAR message is received and while no AAA message has been received, the user is given the opportunity of stopping the current attempt at grouping by means of the question as to whether a GS message has to be sent. If he wishes to stop, a GS message is transmitted to all the stations having the addresses in the group list and the GROUPING? state is again investigated. If an AAA or AAR message is no longer being awaited, a check is made on whether there is a picture request IR with its own destination address ODA to be transmitted. If so, it is necessary to await the picture forwarding in accordance with the process shown in FIG. 6d. Whenever this has been completed, a check is made on whether a picture request still has to be made for the same group. This also takes place when no picture request is present, but the current group cannot as yet be stopped by a GS message. If a GS message does have to be transmitted, the second state GROUPING? in the four mentioned is then investigated again.

The flow chart in FIG. 6d shows the process DYN.DA? for the continuous investigation of whether a dynamic destination address has been assigned for the forwarding of a subsequent picture packet optionally from the transmitting station involved, and the awaiting of the forwarding of the next picture packet. On receipt, an investigation is made of whether an AA' message has been received. If so, the destination address ODA or GDA, valid at that instant is held (--SAVE OLD DA--), and the dynamic destination address DDA received with the AA' message is used (--USE NEW DA--). A check is then made on whether there is a group still active which has been formed from the present SPAD program and whose group list is still present (--GROUPED?--). If so, a copy of the AA' message received is forwarded to all the receiving stations having an address in the group list (--SEND AA' TO GROUP--). Then a check is always made with ID RECEIVED? on whether the picture packet having said address DDA has already been received. If not, this is continued as long as no EID message has as yet been received, indicating that the picture transmission has been terminated. This check is terminated either if a picture packet ID has been received in its entirety or if an EID message has been received. The DYN.DA? process is then abandoned using the destination address ODA or GDA valid on receipt. If no AA' message has been received, the same in fact takes place with the unaltered destination address ODA or GDA.

FIG. 7, with the component FIGS. 7a and 7b, shows a flow chart of the RPPD program present in a request-processing transmitting station A. The mutual connection between these component figures is again formed here by correspondingly numbered connection circles. After the start-up, START, a check is made, as indicated above, on whether other transmitting stations T are already active. If not, the token is first prepared and transmitted over the network 6, a check is then always made in a queue of picture requests on whether a new picture request has been received (--NEW IR RECEIVED--), and if not, on whether there are still unconcluded picture requests in the list (--OLD IR EXISTS?--). In the case of a new picture request, dynamic grouping (--DG--) is first carried out if possible. For the picture request in the queue whose turn it is, a picture search instruction is then given to a picture source forming part of the transmitting station, followed by a waiting period until the picture packet concerned is ready and waiting in the transmitter memory of the transmitting station (--ID--). Once this is ready and waiting, the receipt is awaited of the token (--TOKEN RECEIVED?--) after a time monitoring has been started for this purpose (--START TIMER--). If the time duration is exceeded in this process (--TIME OUT?Y--), a token is again prepared (--START TOKEN--). If a token is received within the set time, the token is retained (--KEEP TOKEN--) and a check is then made on whether an 'end of packet' is expected (--TRAILER EXPECTED?--). If so, this means that the transmission of a previous picture packet over the picture channel by another transmitter is not yet finished, and a time monitoring is set therefore and detection thereof is awaited (--TRAILER DETECTED?--). If this is detected within the set time, the token is released (--RELEASE TOKEN--), and the instruction is given to transmit the ready and waiting picture packet (--SEND ID--); and once the packet transmission has been completed, this is analysed by means of emitting an EID message over the network 6. If no packet trailer has been detected within the set time, it is assumed that, as a result of garbling, it was not possible to detect the trailer of the previous packet and that the picture channel has now become free for transmission. The token is therefore also released in that case, an instruction is given to transmit the ready and waiting picture packet and, after completion thereof, to emit an EID message. A similar assumption relating to the token can be made and the same actions executed if, after a set time is exceeded on receiving the token, the token is again prepared and transmitted. After the transmission of the EID message, an investigation is again made on whether there is still a picture request IR in the queue (--NEW IR RECEIVED?--). The time monitoring for the receipt of a token can be further refined by an additional time monitoring for a combined packet header/trailer detection, which makes it possible to check whether the picture channel has not been used for a certain time.

FIG. 7c shows, with the aid of a flow chart, the block DG, i.e. dynamic grouping, from FIG. 7a in greater detail. At the beginning thereof, the picture specification, including the cited picture quality, of the newly received picture request IR is compared with all the other picture requests already present in the queue. (--COMPARE IR'S--). If an earlier identical picture request relating to the picture specification is found (--NEW IR UNIQUE?N--), the new picture request caller is forwarded an AA' message containing the destination address of the earlier picture request (--SEND AA'--). This new picture request is then erased (--CANCEL NEW IR--). If the newly received picture request is in fact unique in relation to the picture specification, it is placed in the queue (--KEEP NEW IR--).

Since the token can be a very short message in terms of length, its necessary transmission time is also very short, even though it is transmitted via a low-speed network. Said token message therefore arrives in general over network 6 much earlier than the trailer of the packet being transmitted over the picture channel 10 at that instant can be detected in the detection circuit 20 of the workstation which is forwarded the token at that instant. This guarantees that the packets can always be transported as continuously as possible over the picture channel.

By choosing a broadcast message having a bit pattern which is recognisable only for every transmitting station as a token, the result is achieved in a simple manner that the token only in fact circulates among the active transmitting stations, that all the stations can have one and the same status with respect to one another, and that no information essential for the picture transmission is lost if the token is lost.

We claim:
1. Interactive communication and transport system for requesting, transmitting and receiving bulk data, more particularly of still pictures, comprising:
   a data communication path (6) operable at relatively low speed in a first data communication network,
   a plurality of workstations (A,B) which are coupled to the first data communication network and which are able to communicate with each other via the said data communication path (6), said plurality of workstations including at least one request-processing workstation (A) and at least one destination workstation (B),
   a transmission path (10) operable at relatively high speed in a second data communication network to which said workstations are also coupled, said at least one request-processing workstation (A) being coupled both to said communication path (6) and to said transmission path (10), at least one bulk data source (1–4) provided at said at least one request-processing workstation (A), via which separately specifiable quantities of related bulk data in the at least one bulk data source (1–4) are accessible to the workstations on request, transmitting means (14–17), provided at each request-processing workstation (A), for forwarding, on a request from a workstation initiated by a communication via said data communication path (6), to the request-processing station (A), bulk data specified in said request to at least one destination workstation (B), also specified in said request, via a reserved data channel which is reserved for the purpose along said transmission path (10), supervisor means for regulating access to, and transport over, the reserved data channel of said transmitting means by means of communication via said data communication path (6), said transmitting means (14–17) comprising packet assembling means (16) which assembles the specified bulk data to be transmitted into a single data packet having a predefined structure from which at least a start and an end, and the destination station of the packet, can be deduced, each destination workstation comprising receiving means (11) which, at least for a time in which a data packet intended for the respective destination station is to be expected, continuously scans the reserved data channel along said transmission path (10) for a data packet intended for it and picks up a data packet as soon as it is recognized as intended for it, detection means (18) provided at each request-processing workstation (A) for detecting a packet end on the reserved channel, and wherein a request-processing station (A) which has received permission from the supervisor means for the transmission of a subsequent data packet, giving an instruction to the transmitting means (14–17) thereof for transmission when the detection means (18) has detected the packet end of the last packet to be transmitted previously.

2. Interactive communication and transport system according to claim 1, wherein said supervisor means, by means of communication via said data communication path (6), assigns one or one and the same temporary destination code (DA) for forwarding specified bulk data to at least one specified workstation.

3. Interactive communication and transport system according to claim 2, wherein a similar temporary destination code (DA) is assigned at the request of a workstation prior to a request for specified bulk data.

4. Interactive communication and transport system according to claim 2, wherein said supervisor means maintains a queue of requests for forwarding specified bulk data and continuously checks said queue for the presence of requests for the same specified bulk data and, in the event of such a presence, causes assignment of a similar temporary destination code (DA) to the workstations specified in the respective requests for forwarding of the bulk data.

5. Interactive communication and transport system according to any one of claims 1–4, wherein:

the supervisor means includes a token mechanism in which permission can be granted for transmission of a data packet by means of forwarding a token message over said data communication path (6) to stations attached thereto, and a request-processing station (A) only seizes the token message if and as long as a data packet is ready and waiting for transmission in the transmitting means (14–17) added to said station, the detection means (18) has not yet detected an end of packet of the last data packet to be transmitted previously, and the transmission of the packet ready and waiting has not yet been started.

6. Interactive communication and transport system according to claim 5, wherein the token message comprises a broadcast message having a pattern which is only recognisable for a request-processing station.

7. Interactive communication and transport system according to any one of claims 1–4, wherein:

the at least one bulk data source means (1–4) at a request-processing workstation (A) comprises an analog picture-signal source which emits an analog picture signal of a requested picture; and said transmitting means (14–17) comprises:

A/D conversion means (14) having an adjustable bit rate for converting an analog picture signal into a digital picture signal having the bit rate then set, and bit rate setting means (16) for setting the A/D conversion means to a bit rate appropriate to a picture quality specified in a request for a picture.

8. Interactive communication and transport system according to any one of claims 1–4, wherein the first data communication network and the second data communication network form part of a broadband communication network which comprises at least one of said relatively low-speed data communication paths (6) and at least one of said relatively high-speed transmission paths (10).

* * * * *